3,013,967
PERFLUOROPROPYLENE AND TETRAFLUOROETHYLENE COPOLYMER AND NYLON BEARING

Robert Rulon-Miller, Saul Ricklin, and William A. Tucker, Jr., Bristol, R.I., assignors to Dixon Corporation, a corporation of Rhode Island
No Drawing. Filed Sept. 10, 1957, Ser. No. 683,010
2 Claims. (Cl. 252—12)

This invention relates to a composition of matter of the type more particularly useful for sliding surfaces such as a bearing where a considerable pressure is applied through the bearing, an instance of which would be a shaft rotating in a cylindrical support.

An object of the invention is to provide a composition which will better withstand wear in an unlubricated bearing which is subjected to pressure loads.

Another object of the invention is to provide a composition with a low coefficient of friction of an unlubricated bearing material which is subjected to loads.

A copolymer of perfluoropropylene and tetrafluoroethylene, also known as E. I. du Pont's Teflon 100X perfluorocarbon resin (10% to 40% perfluoropropylene and 90% to 60% tetrafluoroethylene), when molded into the form desired has a very smooth and slippery or greasy feel to the hand and provides an excellent low coefficient of friction. When used alone, however, it has very low wear resistance to abrasion and will not stand up as a bearing under load. However, we have discovered that by using a synthetic linear polyamide polymer, known in the trade as nylon, with this material, the resistance to abrasion is materially increased, the coefficient of friction is reduced, and the bearing will stand up under greater pressures. Generally speaking, the copolymer of perfluoropropylene and tetrafluoroethylene is present by volume in from 50 percent to 90 percent with a preferred smaller range of from 65-75 percent.

The copolymer of perfluoropropylene and tetrafluoroethylene may have dispersed therethrough particles of nylon. The material with the nylon dispersion is heated or sintered at a temperature ranging from the melting point of the nylon 473° F. to the gel point of the copolymer above-mentioned which is between 545° F. and 563° F. The said copolymer may be present by weight of 100 to 45 parts with the nylon from 1 to 55 parts. In some cases, however, the copolymer may be present by weight of from 1 to 55 parts and the nylon from 100 to 45 parts.

To form into a bearing, compacting of the material under pressure and heat to the gel point of the copolymer is necessary. This gel point of the 100X is between 545° F. and 563° F. A bearing may be formed by extrusion, compression molding or injection molding. An example of extrusion may be where an air-operated ram forces a charge of the powder down into the die or mold. This ram operation is repeated. The charge reaches an externally heated portion of the mold and is there melted. After passing the heated portion of the mold, the material is cooled enough by a draft of air to shrink it to the desired size and shape. The rod-like material is forced out of the die or mold and cut into the proper lengths. The above is where a number of bearings are continuously formed in rod-like fashion and then cut off, but powder mary be placed in a mold shaped for a single bearing. For compression molding the mold must be of a size larger than the finished size in order that shrinkage may be allowed for. A pressure of 2,000 pounds per square inch or more is put on the powder to make it cling together in the form of a bearing. The powder thus formed may then be placed on a pan and be put into an oven where the material is heated up to about 700° F. To heat the material for a bearing of the size about ½" x ½", the heat will be continued for about an hour until the substance becomes translucent. It is possible to take the hot bearings from the oven and force them into different molds of the correct size and then chill them all quickly. This will produce the proper size uniformly solid bearing, and the coefficient of friction will be lowered. The material may also be injection molded.

In some cases some compatible lubricant may be used such as either molybdenum disulphide or aluminum stearate which is added to the mixture of the copolymer and nylon in a range from a fraction of 1 percent to 20 percent. These both have lubricating properties and add to the lubricating value of the composition. The low end of the range, for example 3 percent, is that which is used mostly; that is, .3 lb. of this material will be added to 10 lbs. of the copolymer and nylon composition.

Examples

The following examples of mixtures and their properties may be shown. The results shown below occur from half bearings $9/16$" long run for wear at 120 pounds per square inch on a $9/16$" diameter hardened steel shaft at 800 to 850 r.p.m. The shaft is water cooled internally to hold a constant temperature of not more than 120° F.

| Percentages by Weight | Coefficient of Friction | Thousandths of Inch Wear per Million Feet | Weight Loss in Grams per Million Feet |
|---|---|---|---|
| 75 100X | .181 | | |
| 25 Nylon | | .0017 | .0133 |

We claim:
1. A bearing for a relatively moving surface consisting essentially of a copolymer of substantial quantities of perfluoropropylene and tetrafluoroethylene by volume 50 to 90 percent with the remainder formed of nylon mixed with the copolymer, said mixture having been heated to a temperature ranging from the melting point of nylon to the melting point of the copolymer, said copolymer having 10% to 40% perfluoropropylene and 60% to 90% tetrafluoroethylene.

2. A bearing for a relatively moving surface consisting essentially of a copolymer of substantial quantities of perfluoropropylene and tetrafluoroethylene by volume 65 to 75 percent with the remainder formed of nylon mixed with the copolymer, said mixture having been heated to a temperature ranging from the melting point of nylon to the melting point of the copolymer, said copolymer having 10% to 40% perfluoropropylene and 60% to 90% tetrafluoroethylene.

References Cited in the file of this patent

UNITED STATES PATENTS

| | | |
|---|---|---|
| 2,246,086 | Austin | June 17, 1941 |
| 2,400,091 | Alfthan | May 14, 1946 |
| 2,598,283 | Miller | May 27, 1952 |
| 2,695,425 | Stott | Nov. 30, 1954 |
| 2,698,966 | Stott et al. | Jan. 11, 1955 |
| 2,715,617 | White | Aug. 16, 1955 |
| 2,824,060 | White | Feb. 18, 1958 |

OTHER REFERENCES

Modern Plastics, article by Akin, October 1949, pp. 114, 116, 174 and 177.

"Teflon by Ethylene," Ethylene Chem. Corp., Summit, New Jersey, 1953, 7 pp.

UNITED STATES PATENT OFFICE

CERTIFICATE OF CORRECTION

Patent No. 3,013,967                                December 19, 1961

Robert Rulon-Miller et al.

It is hereby certified that error appears in the above numbered patent requiring correction and that the said Letters Patent should read as corrected below.

Column 2, line 2, for "700° F." read -- 500° F. --.

Signed and sealed this 19th day of June 1962.

(SEAL)
Attest:

ERNEST W. SWIDER                                    DAVID L. LADD
Attesting Officer                                       Commissioner of Patents